United States Patent [19]

Drobner

[11] Patent Number: 5,791,981

[45] Date of Patent: Aug. 11, 1998

[54] ACTUATOR ARRANGEMENT AND SYSTEM USING THE ARRANGEMENT

[75] Inventor: Hans Juergen Drobner, Leonberg, Germany

[73] Assignee: Behr GmbH & Co., Stuttgart, Germany

[21] Appl. No.: 673,385

[22] Filed: Jun. 28, 1996

[30] Foreign Application Priority Data

Jul. 1, 1995 [DE] Germany .................. 195 24 068.5

[51] Int. Cl.$^6$ .................................................. B60H 1/00
[52] U.S. Cl. ...................... 454/69; 137/353; 137/637; 251/129.11; 454/121
[58] Field of Search ............... 454/69, 121; 251/129.01, 251/129.11; 137/637, 637.3, 353, 595, 607

[56] References Cited

U.S. PATENT DOCUMENTS

| | | | |
|---|---|---|---|
| 2,696,361 | 12/1954 | Jensen | 137/607 X |
| 2,831,649 | 4/1958 | Hayslett | 137/637 X |
| 2,921,605 | 1/1960 | Booth et al. | 137/637 X |
| 3,078,874 | 2/1963 | Kolze | 137/607 X |
| 4,633,908 | 1/1987 | Hattori et al. | 137/353 X |
| 4,818,924 | 4/1989 | Burney | 318/561 |
| 5,036,816 | 8/1991 | Mann | 137/637.3 |
| 5,058,624 | 10/1991 | Kolze | 137/607 |
| 5,281,049 | 1/1994 | Holt | |
| 5,322,084 | 6/1994 | Ghiassian | 137/607 |

FOREIGN PATENT DOCUMENTS

| | | | |
|---|---|---|---|
| 0 145 204 | 6/1985 | European Pat. Off. | |
| 0 149 397 | 7/1985 | European Pat. Off. | 454/69 |
| 0 193 794 | 9/1986 | European Pat. Off. | |
| 32 39 642 | 10/1983 | Germany | 454/69 |
| 34 00 793 | 4/1986 | Germany | |
| 36 10 540 | 3/1989 | Germany | |
| 283 870 | 10/1990 | Germany | |

OTHER PUBLICATIONS

"Anwendung von Formgedaechtnis-Legierungen in der Technik" by Dr. P. Tautzenberger et al., ZwF 81 (1986) 12, pp. 703–708.

*Primary Examiner*—Harold Joyce
*Attorney, Agent, or Firm*—Evenson, McKeown, Edwards & Lenahan, P.L.L.C.

[57] ABSTRACT

An actuator arrangement is provided in the case of which the actuators are arranged in a premounted manner in a common actuator module unit. The actuator module unit can then, as a whole, be installed in a corresponding system, such as a heating or air-conditioning system in which the actuators are required. Thus, a space saving arrangement of the required actuators can be implemented which is easy to mount and service and can be used, for example, for heating or air-conditioning.

10 Claims, 1 Drawing Sheet

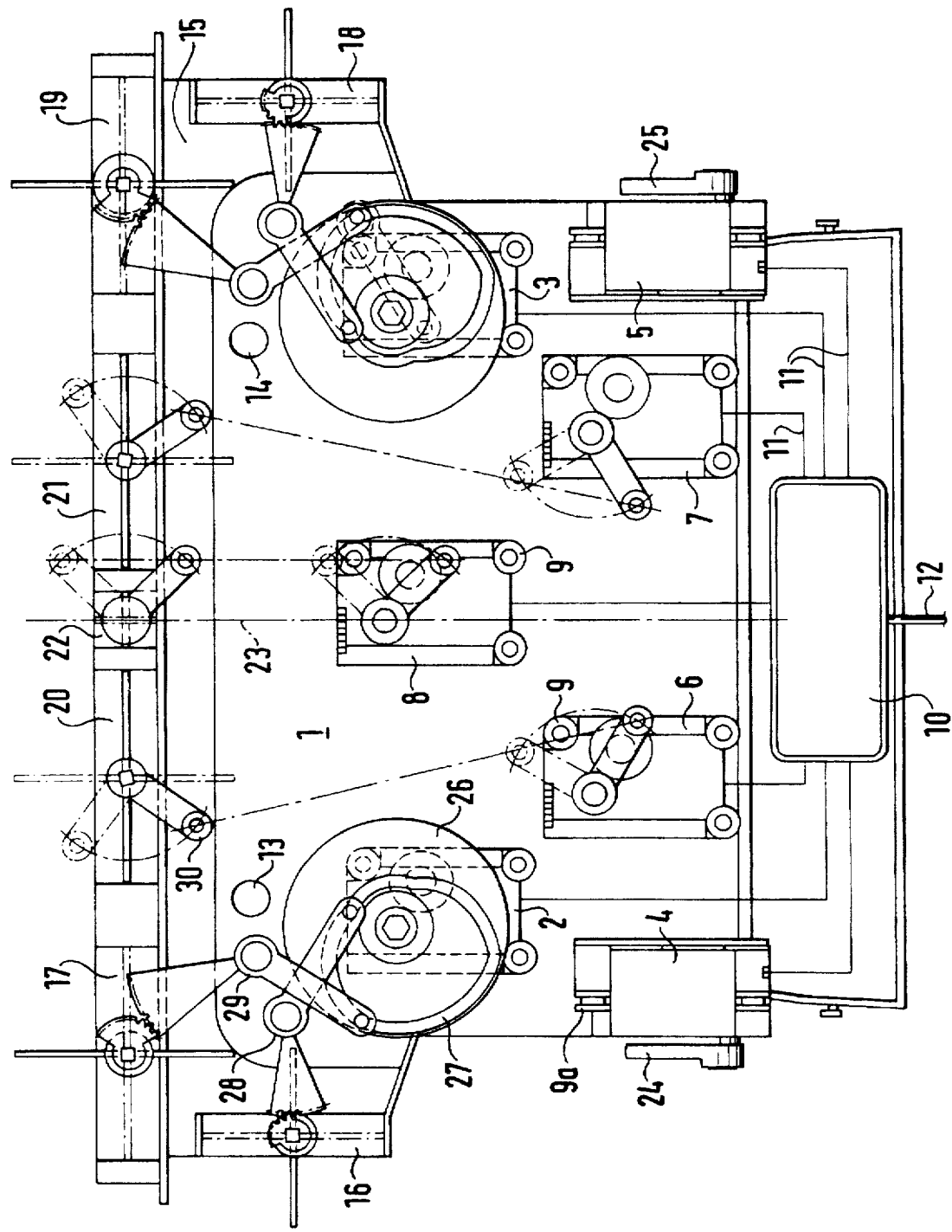

ACTUATOR ARRANGEMENT AND SYSTEM USING THE ARRANGEMENT

BACKGROUND AND SUMMARY OF THE INVENTION

This invention relates to an actuator arrangement having several actuators for actuating control elements, as well as to a system which uses such an actuator arrangement. Systems of this type are, for example, heating and air-conditioning systems for motor vehicles in which a plurality of air flaps and valves are arranged as control elements. The control elements are actuated by associated actuators.

For heating and air-conditioning systems of motor vehicles, it is known to separately mount each actuator for an air flap or a valve on the respective housing sections or other carrier sections of the system. A fastening arrangement which is suitable for this purpose is described in European Patent document EP 0 193 794 A2. In this known approach for individually mounting each actuator, sufficient space for mounting the pertaining actuator is required in the proximity of each control element. Usually, the actuators can be connected with the control unit which controls them only during or after their fastening in the proximity of the pertaining control element. Thus, for example, when servo motors are used as actuators, each servo motor must still be individually electrically connected with a power supply and a control unit during or after its mounting at the intended point. Since the servo motors are normally situated at very different, distant points of the heating or air-conditioning system, a correspondingly large amount of wiring material is required.

There is therefore needed an actuator arrangement which can be implemented through the use of comparably low expenditures, is space saving, and is easy to mount, demount and service. There is further needed a system using such an actuator arrangement.

These needs are met according to the present invention by an actuator arrangement having several actuators for actuating control elements, the actuators being arranged in a premounted manner in a common actuator module unit, as well as by a system having several actuators and control elements which can be actuated by these actuators, wherein in an actuator arrangement, the actuators arranged in the actuator module unit in a premounted manner are coupled with their assigned control elements, which are situated outside the actuator module unit, by way of respective operating members.

In the case of the actuator arrangement according to the present invention, the actuators are arranged in a premounted manner in a common actuator module unit. The actuator module unit can then, as a whole, be mounted as part of a system, which requires these actuators, on the remaining part of the system. Combining the actuators in the form of the actuator module unit saves space in comparison to a separate mounting of the actuators at different points of the system. While, in the case of the conventional individual mounting of actuators, the actuators are often mixed up because of their very similar appearance, thus creating unnecessary additional mounting expenditures, this risk of a mix-up is clearly lower when all required actuators are preassembled neatly in the common actuator module unit so that the expenditures may also be reduced for ensuring a correct actuator arrangement by means of, for example, a mechanical coding.

Another advantage of the module-type combining of the actuators according to the invention is the fact that all actuators, before they are mounted on the system which uses them, are already tested in the actuator module unit with respect to their operability and, if required, may be replaced in a simple manner. After the mounting of the actuator module unit on the pertaining system, the operating members for the control elements must then only be coupled to the actuators and, optionally, the actuator module unit may be connected to an actuator-controlling feeding device.

In a further advantageous embodiment of the invention, a central control unit is provided for the actuators. The central control unit is also arranged in a preassembled manner in the actuator module unit. In this fashion, the actuators can be tested beforehand with respect to their function by way of this control unit. Furthermore, all control connections between the control unit and the actuators can be established during the preassembling of the actuator module unit, in which case, because of the module-type combining of the actuators, the connecting paths are advantageously short. During the mounting of the actuator module unit on the pertaining system, the former must then usually only still be connected to a central external feeding device. In the case of electrically driven actuators and an electric control unit, the connection to the central external feeding device requires comparatively low expenditures of conducting material and wiring measures for establishing the required electrical connections.

In a further advantageous embodiment of the invention, the actuator module unit contains a carrier plate on which the actuators are arranged in a premounted manner. This carrier plate, which, for example, is essentially planar, can then be mounted with a low cost on the pertaining system, for example, on the housing of a heating or air-conditioning system of a motor vehicle. For this purpose, a three-point-holding device of the carrier plate may be sufficient which, as required, may be vibration-damped and/or muffled. This is done so that, by means of soldering only three mechanical connections, all actuators can be removed from the system, for example, for servicing or diagnostic purposes.

A further embodiment of the invention has the advantage that the carrier plate is not only used for holding the actuators, but simultaneously provides, by means of the corresponding areas assigned to the respective actuators, a housing part for the actuators. As an alternative to preassembling, during which the actuators, including their housing parts, are first assembled and are then mounted with their housing on the carrier plate, it is possible via this embodiment to assemble the actuator directly on the corresponding carrier plate area which will then act as a first housing part. Subsequently, for concluding the actuator preassembly, a second housing part is fit on and fixed to the carrier plate. This saves mounting expenditures as well as a respective housing part.

Other objects, advantages and novel features of the present invention will become apparent from the following detailed description of the invention when considered in conjunction with the accompanying drawings.

BRIEF DESCRIPTION OF THE DRAWING

The single figure is a schematic top view of an actuator module unit with an actuator carrier plate used in an air-conditioning system of a motor vehicle according to the present invention.

DETAILED DESCRIPTION OF THE DRAWING

In the case of the illustrated embodiment shown in the Figure, an actuator module unit is formed. Seven actuators 2 to 8 in the form of electric servo motors are arranged on a carrier plate 1 in a premounted manner. The actuators 2 to 8 are each fastened through the use of their housing by way of rubber-buffered and therefore vibration-damped and muffled screwed connections 9 on the carrier plate 1. The arrangement of the actuators is essentially symmetrical with respect to a longitudinal support plate axis 23, five actuators 2, 3, 6, 7, 8 being premounted on the shown carrier plate top side and two actuators 4, 5 being premounted laterally on the carrier plate 1. The clear arrangement of the actuators 2 to 8 on the common carrier plate 1, in comparison to the conventional individual mounting of the actuators at different points of an air-conditioning system housing, reduces the risk that an actuator will be mounted at a wrong point. It is also demonstrated that, because of their combined arrangement on the common carrier plate 1, the actuators 2 to 8 are housed in a very compact and space-saving manner.

Furthermore, the premounted actuator module unit contains a central electric control unit 10 which is also mounted on the actuator carrier plate 1 and which controls the individual actuators 2 to 8 by way of an electric supply line system 11. The electric supply line system 11 additionally includes the current supply lines for the actuators 2 to 8. This supply line system 11 is also finished beforehand during the premounting of the actuator module unit by using respective conductor cables. As an alternative, these electric line connections may also be formed as strip conductors integrated in the carrier plate 1, for the purpose of which the carrier plate 1 will then be designed in a printed-circuit-boardtype fashion. In this case, the electric bondings of the actuators 2 to 8, as well as of the control unit 10, may then optionally take place automatically together with their fastening on the carrier plate 1. Furthermore, as required, the control unit 10 may be implemented as an electronic unit constructed directly on the actuator carrier plate. By way of a central electric connection 12 of the carrier plate 1, the central actuator control unit 10 of the air-conditioning system is connected to a control-unit-linking data bus system of the vehicle-electric system, for example, a CAN bus system, as well as, together with the actuators 2 to 8, to the electric vehicle power supply system.

The premounted actuator module unit will then be mounted on a respectively provided fastening section of the air-conditioning system in a simple manner by means of a detachable three-point fastening device. For reasons of clarity, only a control element section 15 of this fastening section is shown explicitly so that the figure still shows two 13, 14 of the three fastening points. Preferably, muffling and/or vibration damping devices, such as rubber buffers, are also provided on these three fastening points for the actuator carrier plate 1.

Seven control elements 16 to 22 are situated in the illustrated control element section 15 of the air-conditioning system housing, in the form of air flap units for conventional ventilating functions, like cold and warm air, air guidance to the windshield, into the leg room and to the side windows, etc. The figure does not show two additional air flap units of the air-conditioning system which are actuated by the two actuators arranged laterally on the carrier plate 1 by way of operating members 24, 25 shown only partially. The control elements 16 to 22 are arranged, like the actuators 2 to 8, essentially symmetrically with respect to the mentioned longitudinal axis 23. In this case, they carry out ventilating functions for the respective vehicle side, that is, the driver side or the front passenger side.

The air flaps 16 to 22 are actuated by the pertaining actuators 2 to 8 by way of respective operating members which, after the mounting of the carrier plate 1, are mounted on the fastening section of the air-conditioning system. Arbitrary conventional operating members can be used. In the illustrated case, for example, an actuator 6 controls a pertaining air flap unit 20 by way of a toggle lever mechanism 30. In the case of an additional actuator 2, a cam plate 26 is provided into which an eccentric closed cam 27 is entered. By means of an end, a rotating lever mechanism 28 engages in this cam 27, and the resulting lever rotation is transmitted by way of a toothed disk segment on the other end of the rotating lever mechanism 28 to a corresponding toothed disk segment which is non-rotatably disposed on the shaft of another air flap unit 16.

The linking of the actuators 2 to 8 to the common control unit 10 permits the optional actuating of several control elements via a single actuator. This is advantageous particularly for carrying out flap movements which have a functional relationship with one another. This situation occurs very frequently in the case of air-conditioning systems because, for carrying out the various heating, ventilating and air-conditioning functions, several air flaps must frequently be brought simultaneously into certain appropriate positions. Such a multiple actuation of several control elements, in the illustrated air-conditioning system, in the case of the mentioned actuator 2, is implemented by means of the cam plate 26 and correspondingly by means of the symmetrically opposite actuator 3 in that, in addition to the mentioned rotating lever mechanism 28, a second rotating lever mechanism 29 engages in the eccentric closed cam 27 on the end side and transmits the resulting rotating movement to another air flap unit 17.

It is demonstrated above that the shown system implements an increased space-saving housing of the actuators so that the housing of the air-conditioning system may have correspondingly small dimensions without making the mounting of the actuators difficult. The system is very easy to mount and demount. All required actuators 2 to 8 together are premounted with their central control unit 10 and the electric connections on a common carrier plate 1 which can be fastened in an easily detachably manner on the housing or a frame part of the air-conditioning system. Subsequently, only every operating member must be mounted and the carrier plate 1 must be electrically connected. The demounting of the actuator module unit for servicing or diagnostic purposes or for the purpose of an exchange is correspondingly simple. The premounting of all actuators 2 to 8 together with the central control unit 10 also has the advantage that the function of all actuators 2 to 8 can be tested beforehand on the actuator carrier plate 1 outside the vehicle before the actuator module unit is installed into the air-conditioning system. It is also found that the mentioned advantages as a whole have the result that the air-conditioning system can be manufactured at lower cost than by the conventional individual mounting of the different actuators.

It is readily understood that the invention comprises numerous modifications of the illustrated embodiment. Thus, as an alternative, instead of being mounted on an essentially planar carrier plate, the actuators may also be combined within a common actuator module housing to form the actuator module unit. Furthermore, it may be provided to premount the actuators directly on the corresponding carrier plate area which will then take over the function of an actuator housing part, while the respective housing part is saved, and, at the conclusion of the premounting, to fit on a second housing part and to fix it on the carrier plate. Instead of electric servo motors, pneumatic or hydraulic actuating drives may also be used, in which case the type of the actuator control and of the control-element-coupling operating members are to be selected in the appropriate manner. Naturally, the invention is not limited to heating or air-conditioning systems of motor vehicles; on the contrary, they may also be used in any other system in which several control elements exist which are actuated by pertaining actuators.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An actuator module unit for use in a motor vehicle heating or air-conditioning system, comprising:

a plurality of actuators;

a carrier plate having said plurality of actuators pre-mounted at said carrier plate; and a central control unit operatively associated with the plurality of actuators and arranged in a premounted manner on the carrier plate.

2. The actuator module unit according to claim 1, wherein said plurality of actuators are coupled to actuating control elements arranged externally of said carrier plate for controlling the heating or air conditioning system.

3. The actuator module unit according to claim 1, wherein an area of the carrier plate assigned to a respective one of said plurality of actuators forms a part of a housing for the one actuator.

4. The actuator module unit according to claim 2, wherein at least one of the actuators is provided for means for effecting simultaneous operation of at least two of the control elements.

5. A system for a motor vehicle heating or air-conditioning unit, comprising:

an actuator module unit having a carrier plate, a plurality of actuators pre-mounted on said carrier plate (coupleable to actuating control elements), actuating control elements located on the carrier plate, operating members coupling each of the actuating control elements to respective assigned ones of the actuators, and a central control unit operatively associated with the plurality of actuators and arranged in a premounted manner on the carrier plate.

6. The system according to claim 5, wherein said system is used in at least one of a heating and air conditioning unit of a motor vehicle.

7. The system according to claim 5, wherein the operating members associated with at least one of the actuators are configured to effect simultaneous operation of at least two of the control elements.

8. (Amended) A method of forming a system for a heating or air conditioning unit of a motor vehicle, the method comprising the steps of:

pre-mounting a central control unit and a plurality of actuators on a carrier plate;

operatively connecting the central control unit and the actuators;

installing the carrier plate in the motor vehicle; and coupling a plurality of control elements situated outside of the carrier plate to respective assigned ones of said plurality of actuators via respective operating members to control the heating or air-conditioning unit.

9. The method according to claim 8, wherein actuators are premounted in a staggered but symmetrical manner at the carrier plate.

10. The method according to claim 8, wherein at least one of the actuators is coupled to plural control elements via respective operating members.

* * * * *